(12) United States Patent
Liu

(10) Patent No.: US 12,091,115 B1
(45) Date of Patent: Sep. 17, 2024

(54) WALL SUSPENSION RACK FOR BICYCLE

(71) Applicant: Yao-Huang Liu, Tainan (TW)

(72) Inventor: Yao-Huang Liu, Tainan (TW)

( * ) Notice: Subject to any disclaimer, the term of this patent is extended or adjusted under 35 U.S.C. 154(b) by 0 days.

(21) Appl. No.: 18/350,015

(22) Filed: Jul. 11, 2023

(51) Int. Cl.
*B62H 3/06* (2006.01)
*B62H 3/12* (2006.01)

(52) U.S. Cl.
CPC ............. *B62H 3/06* (2013.01); *B62H 3/12* (2013.01)

(58) Field of Classification Search
CPC ............. B62H 3/06; B62H 3/04; B62H 3/12
USPC .................................................. 211/17, 18, 19
See application file for complete search history.

(56) References Cited

U.S. PATENT DOCUMENTS

| | | | | |
|---|---|---|---|---|
| 607,024 | A * | 7/1898 | Durfee et al. ........... | B62H 3/12 211/99 |
| 610,656 | A * | 9/1898 | Martin .................... | B62H 3/12 211/104 |
| 618,394 | A * | 1/1899 | Clark ...................... | B62H 3/12 211/18 |
| 643,016 | A * | 2/1900 | Thum ..................... | B62H 3/00 211/104 |
| 3,883,002 | A * | 5/1975 | Moore .................... | B62H 3/08 211/21 |
| 3,976,200 | A * | 8/1976 | Munns .................... | B62H 3/12 211/100 |
| 4,116,341 | A * | 9/1978 | Hebda .................... | B60R 9/06 224/532 |
| 4,221,353 | A * | 9/1980 | Kuhn ...................... | A01M 7/0075 248/564 |
| 4,343,404 | A * | 8/1982 | Folsom .................. | B25H 1/0007 248/114 |
| 4,400,129 | A * | 8/1983 | Eisenberg .............. | B60R 9/06 224/532 |
| 5,056,700 | A * | 10/1991 | Blackburn .............. | B60R 9/10 224/493 |
| 5,125,517 | A * | 6/1992 | Martinell ................ | B62H 3/12 211/90.03 |
| 5,246,120 | A * | 9/1993 | Walker ................... | B62H 3/12 211/21 |
| 5,447,241 | A * | 9/1995 | Bureau ................... | B62H 3/02 211/5 |
| 5,474,189 | A * | 12/1995 | Peterson ................ | B62H 3/12 211/96 |
| 5,553,718 | A * | 9/1996 | Robar ..................... | B62H 3/00 224/924 |
| 5,642,820 | A * | 7/1997 | Angeles .................. | B62H 3/06 211/103 |

(Continued)

*Primary Examiner* — Jennifer E. Novosad
(74) *Attorney, Agent, or Firm* — Chun-Ming Shih; LANWAY IPR SERVICES

(57) ABSTRACT

A wall suspension rack includes an upper wall seat secured to a wall, a lower wall seat secured to the wall, an upright post mounted between the upper wall seat and the lower wall seat and having an upper block and a lower block, a sliding unit mounted on the upright post and including an upper locking groove and a lower locking groove, a positioning unit mounted on the upright post, an upper protective frame pivotally connected with the sliding unit, and a lower suspension frame pivotally connected with the positioning unit and the upper protective frame. Thus, when the lower suspension frame is moved to the folded position, the upper block is locked in the upper locking groove, and when the lower suspension frame is moved to the expanded position, the lower block is locked in the lower locking groove.

4 Claims, 9 Drawing Sheets

(56) References Cited

U.S. PATENT DOCUMENTS

| | | | | |
|---|---|---|---|---|
| 5,685,686 A * | 11/1997 | Burns | B60R 9/10 | 403/374.5 |
| 5,941,397 A * | 8/1999 | Buchanan | B62H 3/12 | 211/19 |
| 5,984,111 A * | 11/1999 | Pennella | B62H 3/00 | 211/5 |
| 6,095,344 A * | 8/2000 | White | B62H 3/12 | 211/21 |
| 6,269,958 B1 * | 8/2001 | Pollock | F16M 13/02 | 211/104 |
| 6,302,278 B1 * | 10/2001 | Dueck | A47F 7/00 | 211/104 |
| 6,648,148 B1 * | 11/2003 | Bally | F16M 13/02 | 211/104 |
| 6,691,878 B1 * | 2/2004 | Ouitz | A47B 97/00 | 211/104 |
| 6,729,478 B1 * | 5/2004 | Boers | B62H 3/12 | 211/18 |
| 6,772,927 B2 * | 8/2004 | Bogoslofski | B60R 9/10 | 211/20 |
| 7,225,933 B1 * | 6/2007 | Pollock | B62H 3/12 | 211/171 |
| 7,240,816 B2 * | 7/2007 | Tsai | B60R 9/06 | 211/195 |
| 7,854,331 B2 * | 12/2010 | Ouyang | B62H 3/12 | 211/18 |
| 8,413,820 B2 | 4/2013 | Steadman et al. | | |
| 9,056,640 B2 * | 6/2015 | Vineyard | B62H 3/06 | |
| 11,780,518 B1 * | 10/2023 | Ho | B62H 3/08 | 211/19 |
| 2007/0007316 A1 * | 1/2007 | Witczak | B60R 9/042 | 224/310 |
| 2007/0256989 A1 * | 11/2007 | Steadman | B62H 3/06 | 211/21 |
| 2021/0380195 A1 * | 12/2021 | Canfield | B62K 25/30 | |
| 2023/0115285 A1 * | 4/2023 | Owen | B62H 3/12 | 211/19 |
| 2023/0192205 A1 * | 6/2023 | Rasmussen | B62H 3/04 | 211/20 |

* cited by examiner

WALL SUSPENSION RACK FOR BICYCLE

BACKGROUND OF THE INVENTION

Field of the Invention

The present invention relates to a rack and, more particularly, to a wall suspension rack for a bicycle.

Description of the Related Art

A popular bicycle rack is mounted on a wall and is pivoted between a horizontal position and a folded position. When the bicycle rack is moved to the horizontal position, the bicycle rack is used to hang the wheel of a bicycle. Alternatively, the bicycle rack is moved to the folded position when not in use, to save the space of storage. However, it is necessary to install a positioning device additionally on the bicycle rack to prevent the bicycle rack from falling to the horizontal position due to the gravity, thereby increasing the cost of the bicycle rack. Moreover, the user has to operate the positioning device in addition to normal operation of the bicycle rack, thereby greatly causing inconvenience to the user in operating the bicycle rack.

A conventional bicycle rack was disclosed in the U.S. Pat. No. 8,413,820, and is secured to a wall for hanging the front wheel of a bicycle. However, such a conventional bicycle rack has many parts, thereby increasing the cost of fabrication and production. In addition, the conventional bicycle rack has a complicated construction and is not assembled easily and conveniently, thereby wasting the time and labor work. Further, the conventional bicycle rack cannot swing horizontally so that the angle of the conventional bicycle rack cannot be adjusted according to the practical requirement.

BRIEF SUMMARY OF THE INVENTION

In accordance with the present invention, there is provided a wall suspension rack for a bicycle, comprising an upper wall seat secured to a wall, a lower wall seat secured to the wall, an upright post mounted between the upper wall seat and the lower wall seat, a sliding unit mounted on the upright post, a positioning unit mounted on the upright post, an upper protective frame pivotally connected with the sliding unit, and a lower suspension frame pivotally connected with the positioning unit and the upper protective frame. The lower wall seat is located under the upper wall seat. The lower wall seat is provided with multiple positioning recesses. The positioning recesses are arranged at an interval along an imaginary arc line. The upright post is pivotally connected with the upper wall seat and the lower wall seat. The upright post is driven and rotated by an external force. The upright post has a peripheral face provided with an upper block and a lower block. The upper block and the lower block extend axially on the upright post. The sliding unit includes a slide, an upper pivot jaw, an upper spring, a lower pivot jaw, and a lower spring. The slide is slidably mounted on the upright post. The slide is driven by the external force and moved upward and downward on the upright post. The upright post extends through the slide. The upper pivot jaw is pivotally mounted on the slide. The upper pivot jaw is provided with an upper locking groove. The upper spring is biased between the slide and the upper pivot jaw. The upper spring provides an elastic restoring force to the upper pivot jaw. The lower pivot jaw is pivotally mounted on the slide. The lower pivot jaw is provided with a lower locking groove. The lower spring is biased between the slide and the lower pivot jaw. The lower spring provides an elastic restoring force to the lower pivot jaw. The positioning unit includes a connecting seat and an elastic pin. The connecting seat is secured to the upright post. The connecting seat is rotated in concert with the upright post. The elastic pin is mounted on a bottom face of the connecting seat. The elastic pin is moved along the imaginary arc line of the positioning recesses. When the upright post is rotated by the external force, the elastic pin is moved to align with and detachably extend into one of the positioning recesses. The upper protective frame is pivotally connected with the slide of the sliding unit. The lower suspension frame is pivotally connected with the connecting seat of the positioning unit. The lower suspension frame is driven by the external force and moved reciprocatingly between a folded position and an expanded and suspended position. In practice, when the lower suspension frame is moved to the folded position, the upper block of the upright post is locked in the upper locking groove of the upper pivot jaw of the sliding unit, and when the lower suspension frame is moved to the expanded and suspended position, the lower block of the upright post is locked in the lower locking groove of the lower pivot jaw of the sliding unit.

According to the primary advantages of the present invention, when the lower suspension frame is moved to the folded position or the expanded position, the lower suspension frame is positioned simultaneously, so that the user only needs to fold or expand the lower suspension frame directly without having to additionally lock the lower suspension frame, thereby simplifying the procedure of operation, and thereby greatly facilitating the user operating the wall suspension rack. In addition, the lower suspension frame swings horizontally to adjust the angles of placement, so that the upper protective frame and the lower suspension frame are positioned at different angles to facilitate the user placing and hanging the bicycle at different situations.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
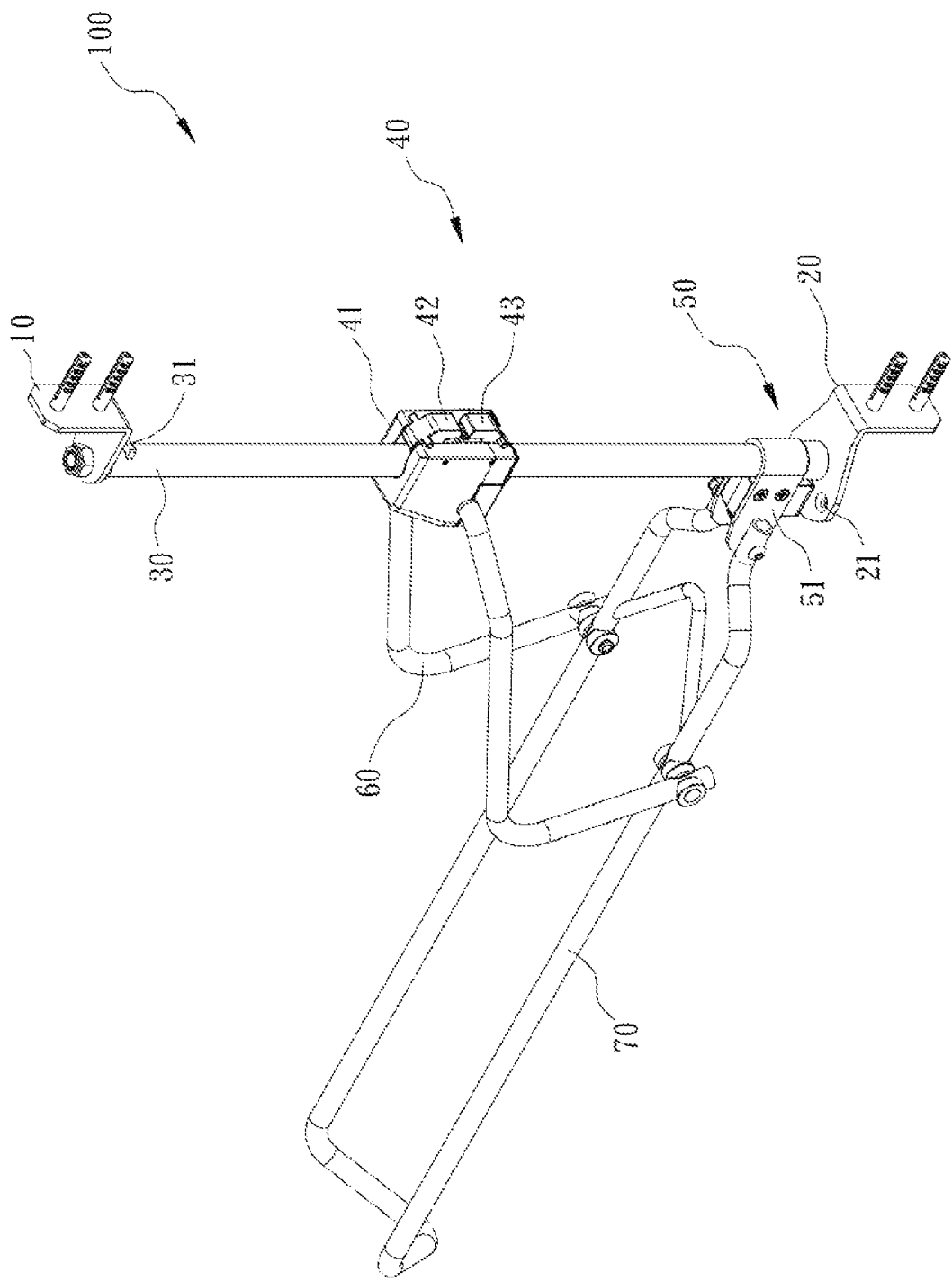
FIG. 1 is a perspective view showing an expanded state of a wall suspension rack for a bicycle in accordance with the preferred embodiment of the present invention.

Referring to the drawings and initially to FIGS. 1-6, a wall suspension rack 100 for a bicycle in accordance with the preferred embodiment of the present invention comprises an upper wall seat (or wall bracket or wall fixture) 10 secured to a wall, a lower wall seat (or wall bracket or wall fixture) 20 secured to the wall, an upright post 30 mounted between the upper wall seat 10 and the lower wall seat 20, a sliding unit 40 mounted on the upright post 30, a positioning unit 50 mounted on the upright post 30, an upper protective frame 60 pivotally connected with the sliding unit 40, and a lower suspension frame 70 pivotally connected with the positioning unit 50 and the upper protective frame 60.

The lower wall seat 20 is located under the upper wall seat 10. The lower wall seat 20 is provided with multiple positioning recesses. Preferably, the lower wall seat 20 is provided with three positioning recesses 21, 22, and 23. The positioning recesses 21, 22, and 23 are arranged at an interval along an imaginary arc line.

The upright post 30 is pivotally connected with the upper wall seat 10 and the lower wall seat 20. The upright post 30 is driven by an external force and rotated about its axis. The upright post 30 has a peripheral face provided with an upper block 31 and a lower block 32. The upper block 31 and the lower block 32 extend axially on the upright post 30.

The sliding unit 40 includes a slide 41, an upper pivot jaw 42, an upper spring 43, a lower pivot jaw 44, and a lower spring 45. The slide 41 is slidably mounted on the upright post 30. The slide 41 is driven by the external force and moved upward and downward on the upright post 30. The upright post 30 extends through the slide 41. The upper pivot jaw 42 is pivotally mounted on the slide 41. The upper pivot jaw 42 is provided with an upper locking groove 421. The upper spring 43 is biased between the slide 41 and the upper pivot jaw 42. The upper spring 43 provides an elastic restoring force to the upper pivot jaw 42. The lower pivot jaw 44 is pivotally mounted on the slide 41. The lower pivot jaw 44 is provided with a lower locking groove 441. The lower spring 45 is biased between the slide 41 and the lower pivot jaw 44. The lower spring 45 provides an elastic restoring force to the lower pivot jaw 44.

The positioning unit 50 includes a connecting seat 51 and an elastic pin 52. The connecting seat 51 is secured to the upright post 30. The connecting seat 51 is rotated in concert with the upright post 30. The elastic pin 52 is mounted on a bottom face of the connecting seat 51 and rotated in concert with the connecting seat 51. The elastic pin 52 is moved along the imaginary arc line of the positioning recesses 21, 22, and 23. When the upright post 30 is rotated by the external force, the elastic pin 52 is moved to align with and detachably extend into one of the positioning recesses 21, 22, and 23.

The upper protective frame 60 is pivotally connected with the slide 41 of the sliding unit 40.

The lower suspension frame 70 is pivotally connected with the connecting seat 51 of the positioning unit 50. The lower suspension frame 70 is driven by the external force and moved reciprocatingly between a folded position and an expanded and suspended position.

In practice, when the lower suspension frame 70 is moved to the folded position, the upper block 31 of the upright post 30 is locked in the upper locking groove 421 of the upper pivot jaw 42 of the sliding unit 40, and when the lower suspension frame 70 is moved to the expanded and suspended position, the lower block 32 of the upright post 30 is locked in the lower locking groove 441 of the lower pivot jaw 44 of the sliding unit 40.

Figure 2:
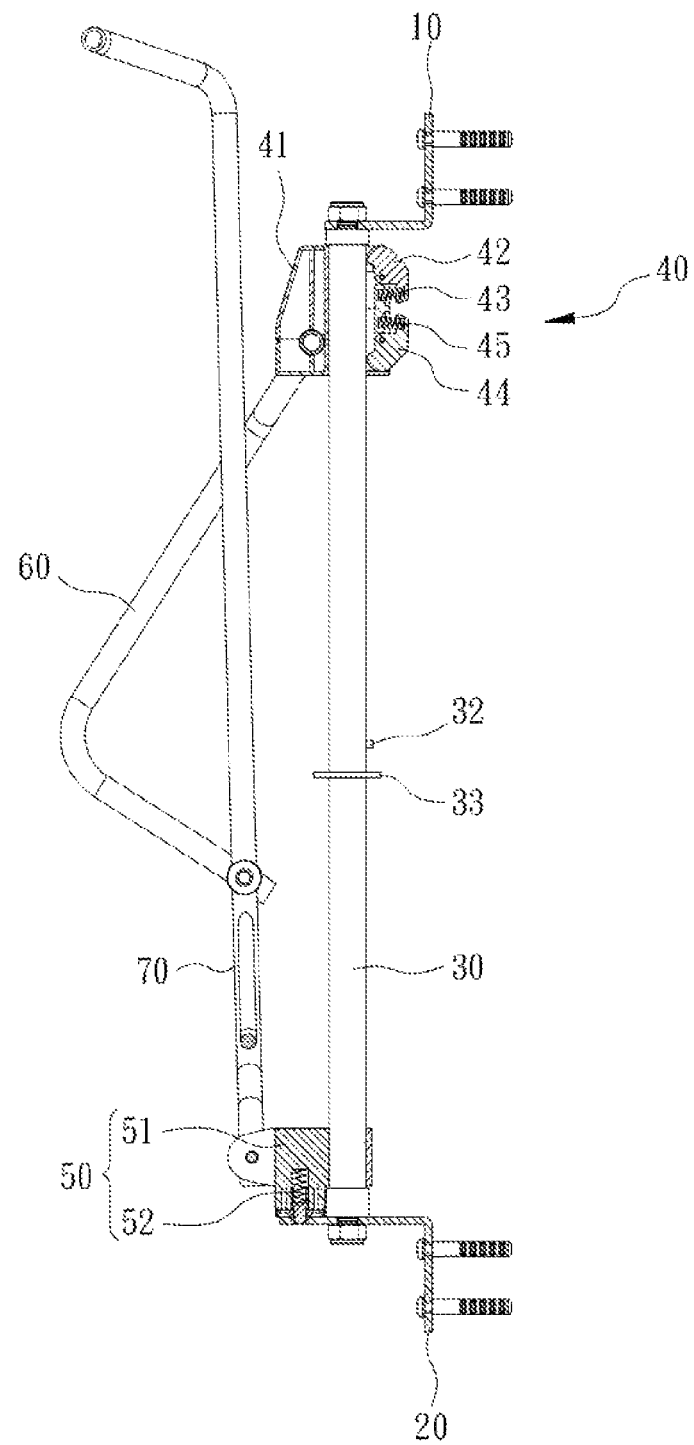
FIG. 2 is a cross-sectional view showing an expanded state of the wall suspension rack for a bicycle in accordance with the preferred embodiment of the present invention.

In such a manner, when the lower suspension frame 70 is moved to the folded position, the lower suspension frame 70 is disposed at an upright state and is close to the upright post 30 as shown in FIG. 2, to reduce the whole volume of the wall suspension rack. In addition, when the lower suspension frame 70 is moved to the expanded and suspended position, the lower suspension frame 70 is disposed at a horizontal state as shown in FIG. 1. Thus, the front wheel of a bicycle is suspended on the lower suspension frame 70, with two sides of the front wheel being restricted by upper protective frame 60.

In the preferred embodiment of the present invention, the peripheral face of the upright post 30 is provided with a lower stop 33 located under the lower block 32. The lower block 32 is arranged between the upper block 31 and the lower stop 33.

In the preferred embodiment of the present invention, the upper pivot jaw 42 has an arcuate top edge, and the upper locking groove 421 is situated at an inner side of the upper pivot jaw 42. In addition, the lower pivot jaw 44 has an arcuate bottom edge, and the lower locking groove 441 is situated at an inner side of the lower pivot jaw 44.

In the preferred embodiment of the present invention, the lower suspension frame 70 is an elongated oblong loop.

In the preferred embodiment of the present invention, the elastic pin 52 is a spring-biased pin.

In the preferred embodiment of the present invention, the upright post 30 is perpendicular to the upper wall seat 10 and the lower wall seat 20.

In the preferred embodiment of the present invention, the elastic pin 52 is elastic and flexible.

In the preferred embodiment of the present invention, the upper protective frame 60 has a first end pivotally connected with the slide 41 of the sliding unit 40 and a second end pivotally connected with the lower suspension frame 70.

Figure 3:
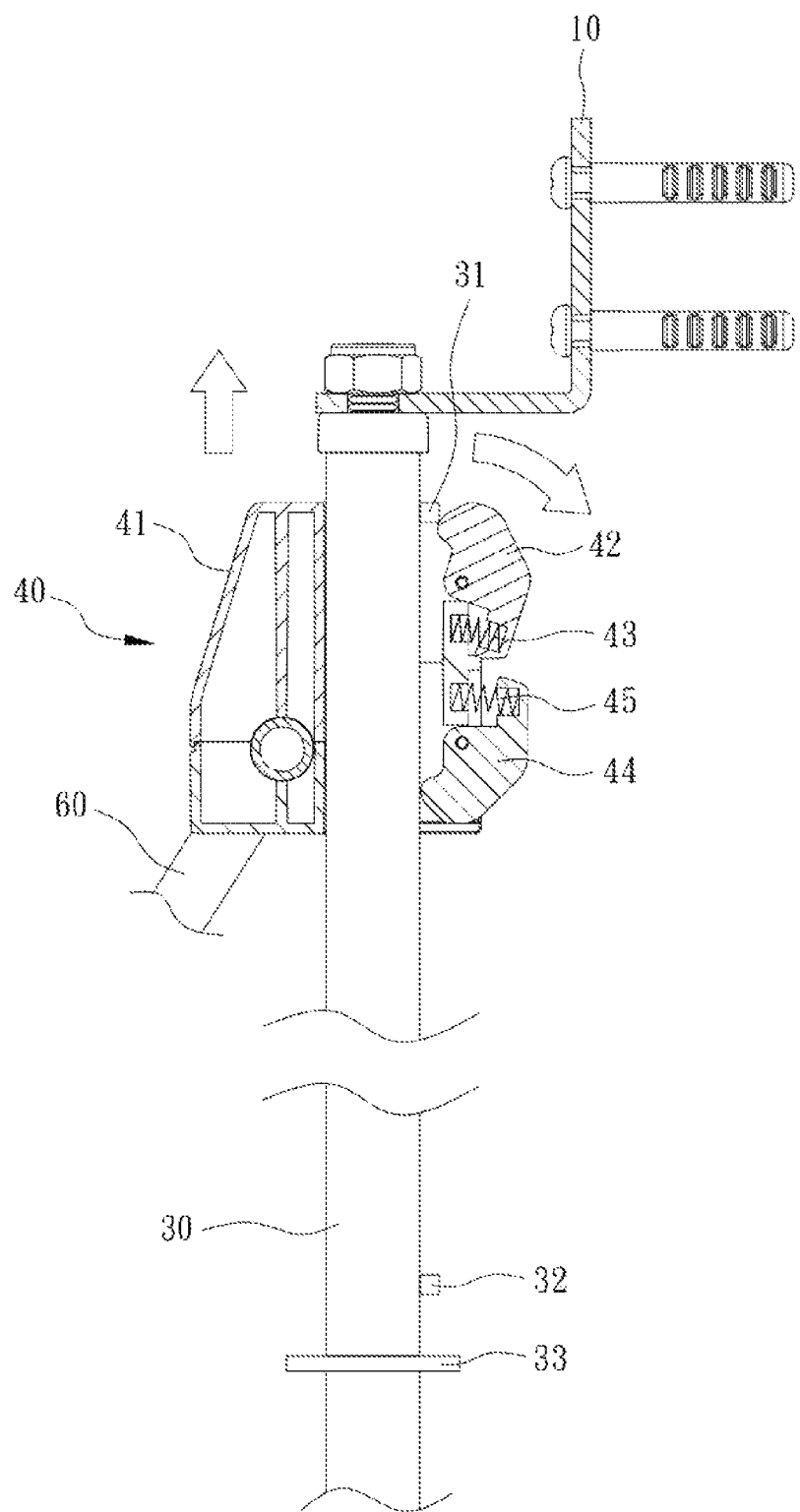
FIG. 3 is a locally enlarged cross-sectional view showing operation of the wall suspension rack as shown in FIG. 2.
Figure 4:
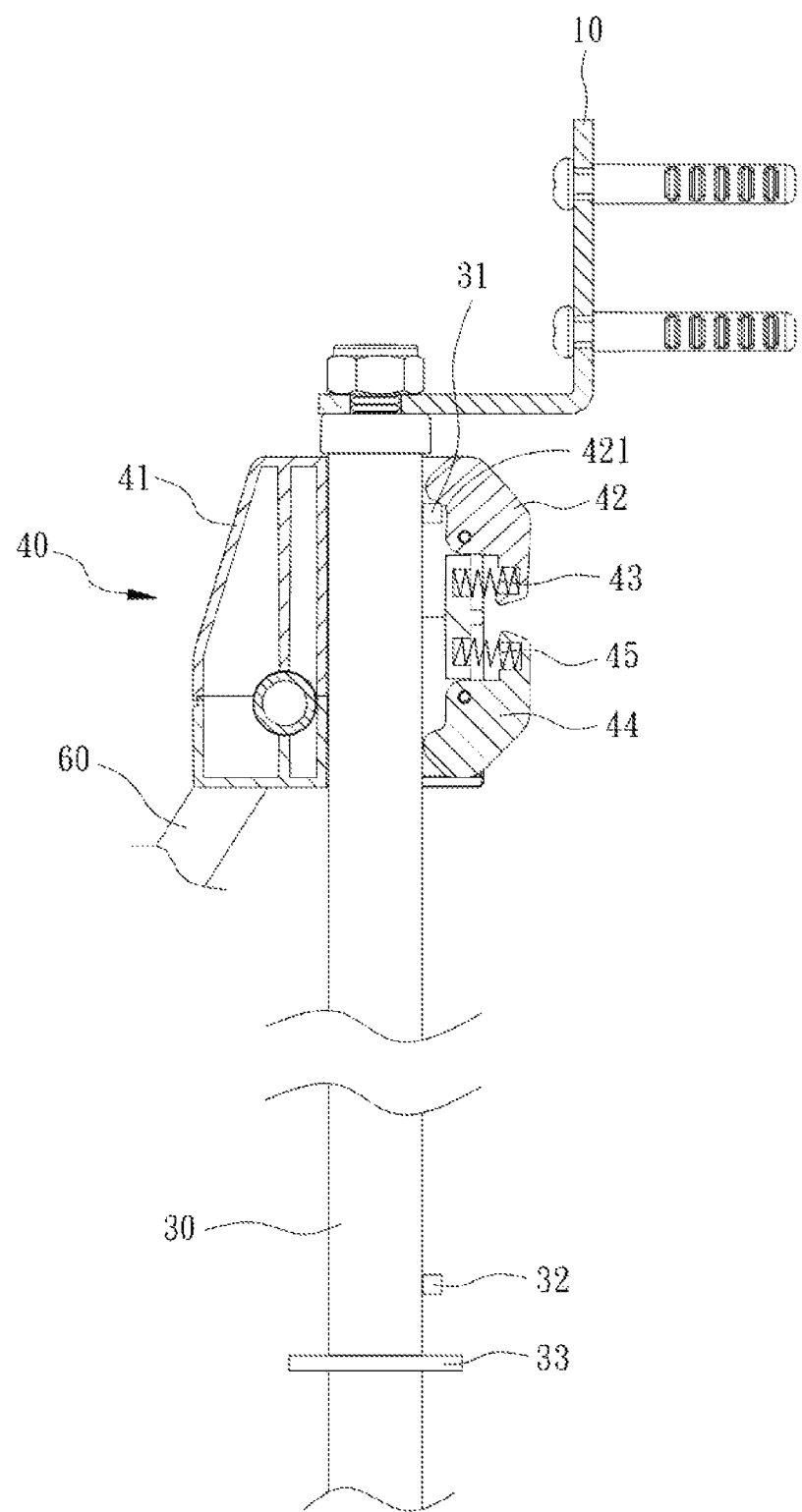
FIG. 4 is a schematic operational view of the wall suspension rack as shown in FIG. 3.

In operation, referring to FIGS. 3-6 with reference to FIGS. 1 and 2, when the lower suspension frame 70 is held and driven upward by the user's hand, the lower suspension frame 70 is pivoted upward, and the upper protective frame 60 is driven by the lower suspension frame 70 and is moved upward. Then, the sliding unit 40 is driven by the upper protective frame 60 and is moved upward on the upright post 30 until the upper pivot jaw 42 of the sliding unit 40 touches the upper block 31 of the upright post 30. At this time, the upper pivot jaw 42 has an arcuate top edge, so that when the upper pivot jaw 42 touches the upper block 31 of the upright post 30, the top edge of the upper pivot jaw 42 is pushed outward by the upper block 31 of the upright post 30, the upper pivot jaw 42 is pivoted outward as shown in FIG. 3, and the upper spring 43 is compressed by the upper pivot jaw 42. When the sliding unit 40 is further moved upward until the upper block 31 of the upright post 30 extends into the upper locking groove 421 of the upper pivot jaw 42, the force of the upper block 31 applied on the upper pivot jaw 42 disappears, and the upper pivot jaw 42 is pushed by the restoring force of the upper spring 43 and is pivoted inward, so that the top edge of the upper pivot jaw 42 is moved inward, and the upper block 31 of the upright post 30 is locked in the upper locking groove 421 of the upper pivot jaw 42 as shown in FIG. 4. Thus, the sliding unit 40 is positioned by the upper block 31 of the upright post 30.

In such a manner, the lower suspension frame 70 is positioned at the folded position as shown in FIG. 2, to reduce the whole volume of the wall suspension rack in storage. In addition, the lower suspension frame 70 is pushed upward and positioned directly when reaching the folded position so that the user needs not to additionally operate and lock the lower suspension frame 70, thereby greatly facilitating the user operating and folding the wall suspension rack.

Figure 5:
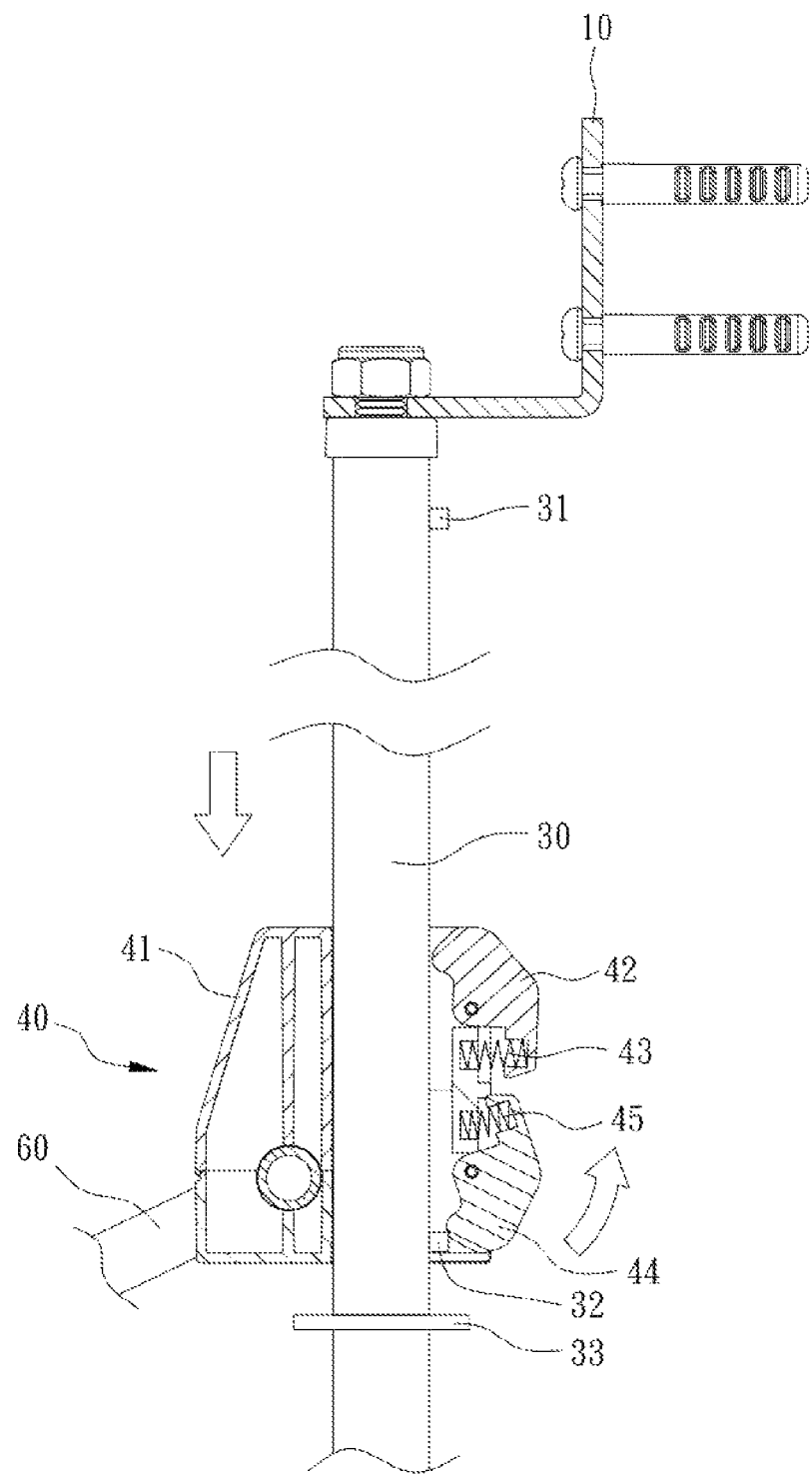
FIG. 5 is a locally enlarged cross-sectional view showing another operation of the wall suspension rack as shown in FIG. 2.
Figure 6:
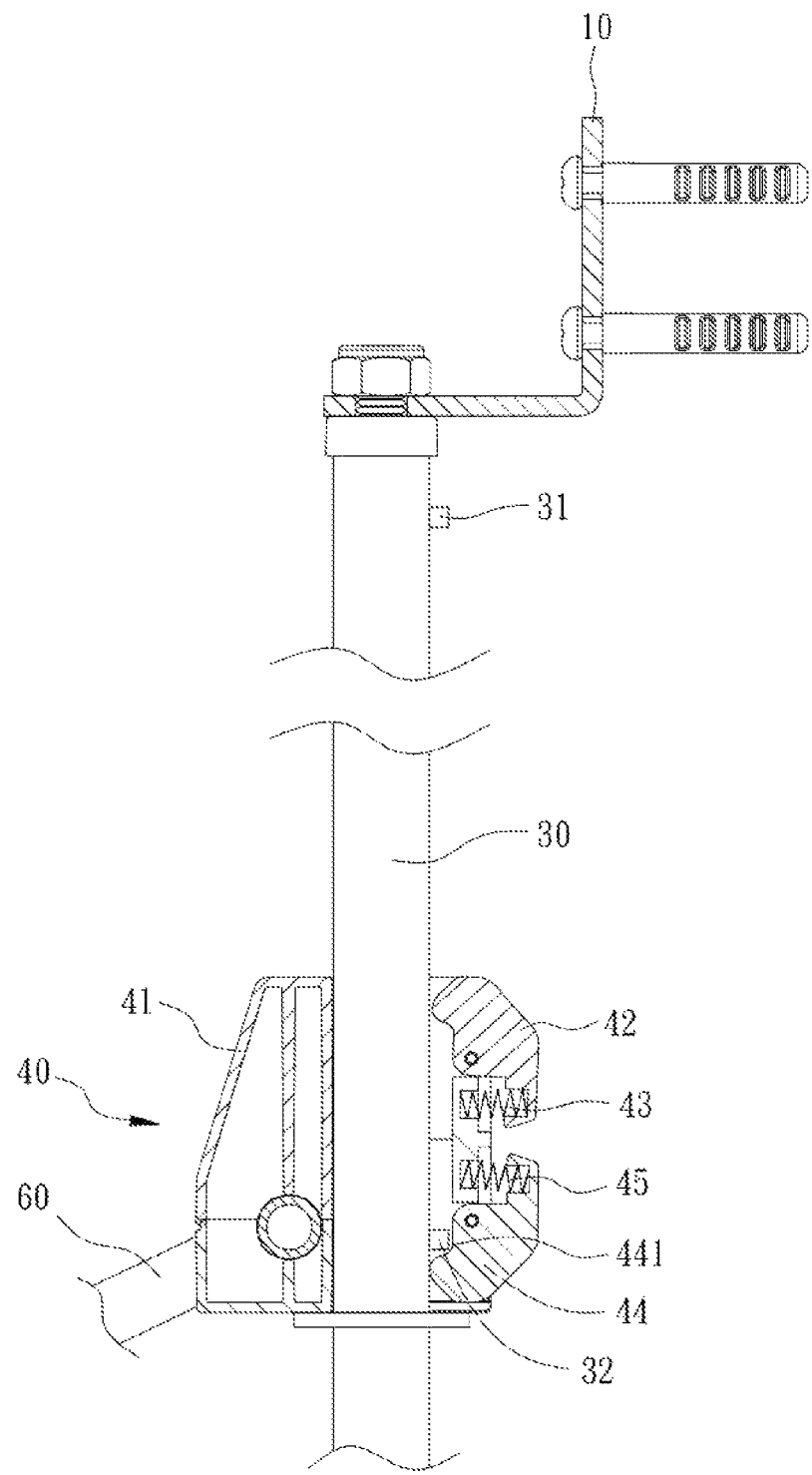
FIG. 6 is a schematic operational view of the wall suspension rack as shown in FIG. 5.

On the contrary, when the lower suspension frame 70 is held and driven downward by the user's hand, the lower suspension frame 70 is pivoted downward, and the upper protective frame 60 is driven by the lower suspension frame 70 and is moved downward. Then, the sliding unit 40 is driven by the upper protective frame 60 and is moved downward on the upright post 30 until the lower pivot jaw 44 of the sliding unit 40 touches the lower block 32 of the upright post 30. At this time, the lower pivot jaw 44 has an arcuate bottom edge, so that when the lower pivot jaw 44 touches the lower block 32 of the upright post 30, the top edge of the lower pivot jaw 44 is pushed outward by the lower block 32 of the upright post 30, the lower pivot jaw 44 is pivoted outward as shown in FIG. 5, and the lower spring 45 is compressed by the lower pivot jaw 44. When the sliding unit 40 is further moved downward until the lower block 32 of the upright post 30 extends into the lower locking groove 441 of the lower pivot jaw 44, the force of the lower block 32 applied on the lower pivot jaw 44 disappears, and the lower pivot jaw 44 is pushed by the restoring force of the lower spring 45 and is pivoted inward, so that the top edge of the lower pivot jaw 44 is moved inward, and the lower block 32 of the upright post 30 is locked in the lower locking groove 441 of the lower pivot jaw 44 as shown in FIG. 6. Thus, the sliding unit 40 is positioned by the lower block 32 of the upright post 30. At this time, the slide 41 of the sliding unit 40 rests on and is stopped by the lower stop 33.

In such a manner, the lower suspension frame 70 is positioned at the expanded and suspended position as shown in FIG. 1, to allow placement of the front wheel of the bicycle. In addition, the lower suspension frame 70 is pulled downward and positioned directly when reaching the expanded and suspended position so that the user needs not to additionally operate and lock the lower suspension frame 70, thereby greatly facilitating the user operating and expanding the wall suspension rack.

Figure 7:
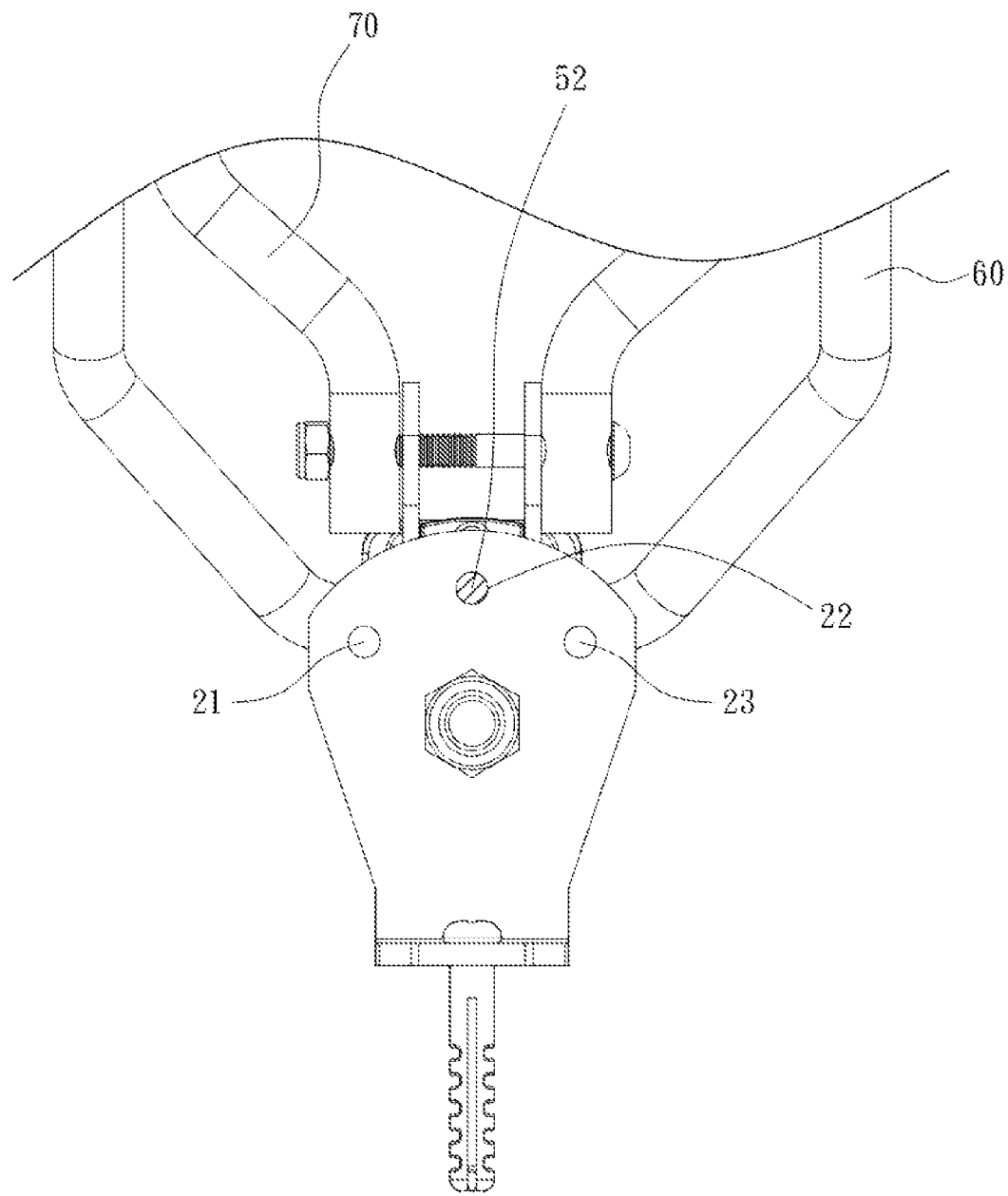
FIG. 7 is a locally enlarged view showing operation of the wall suspension rack as shown in FIG. 1.
Figure 8:
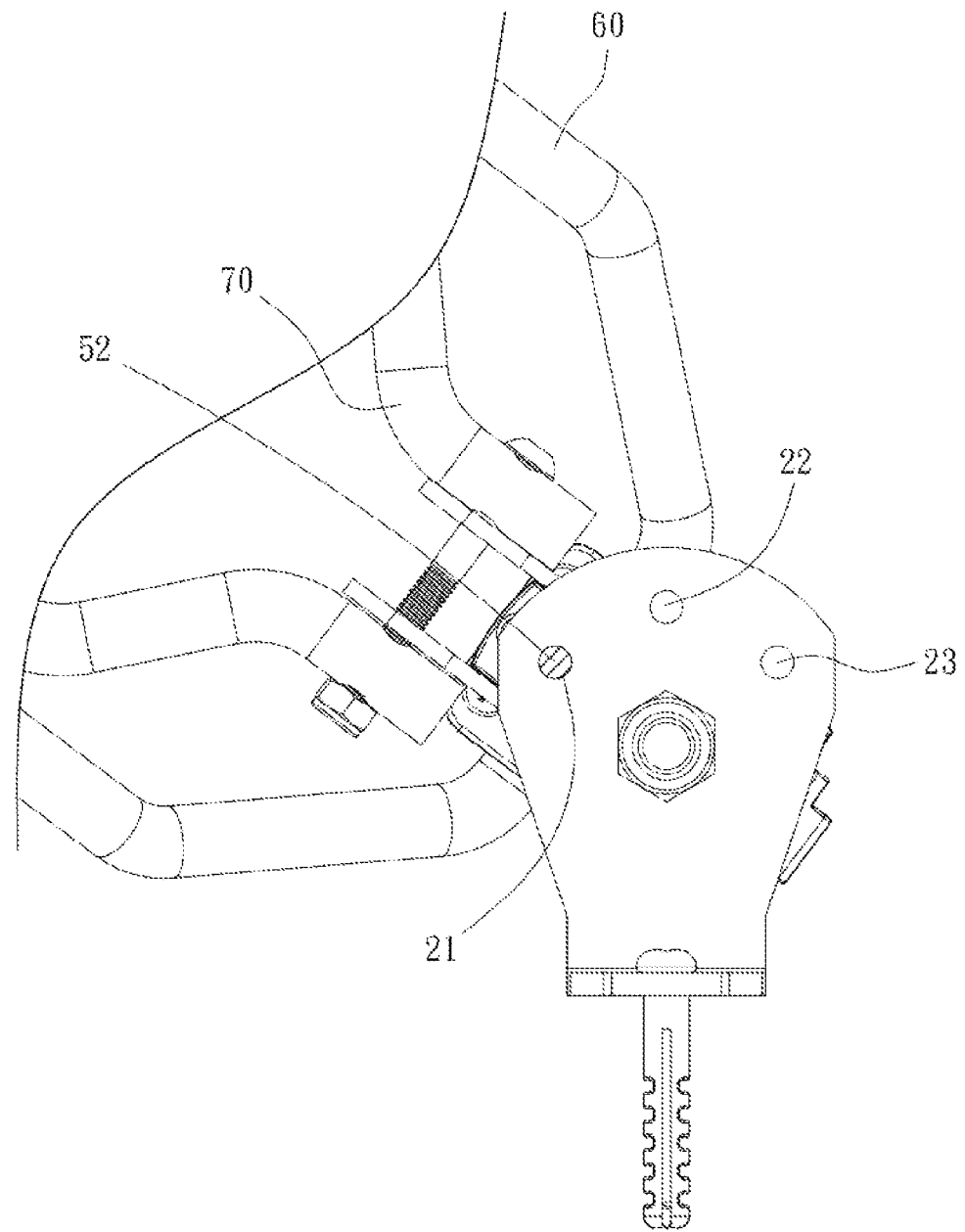
FIG. 8 is a locally enlarged view showing another operation of the wall suspension rack as shown in FIG. 1.
Figure 9:
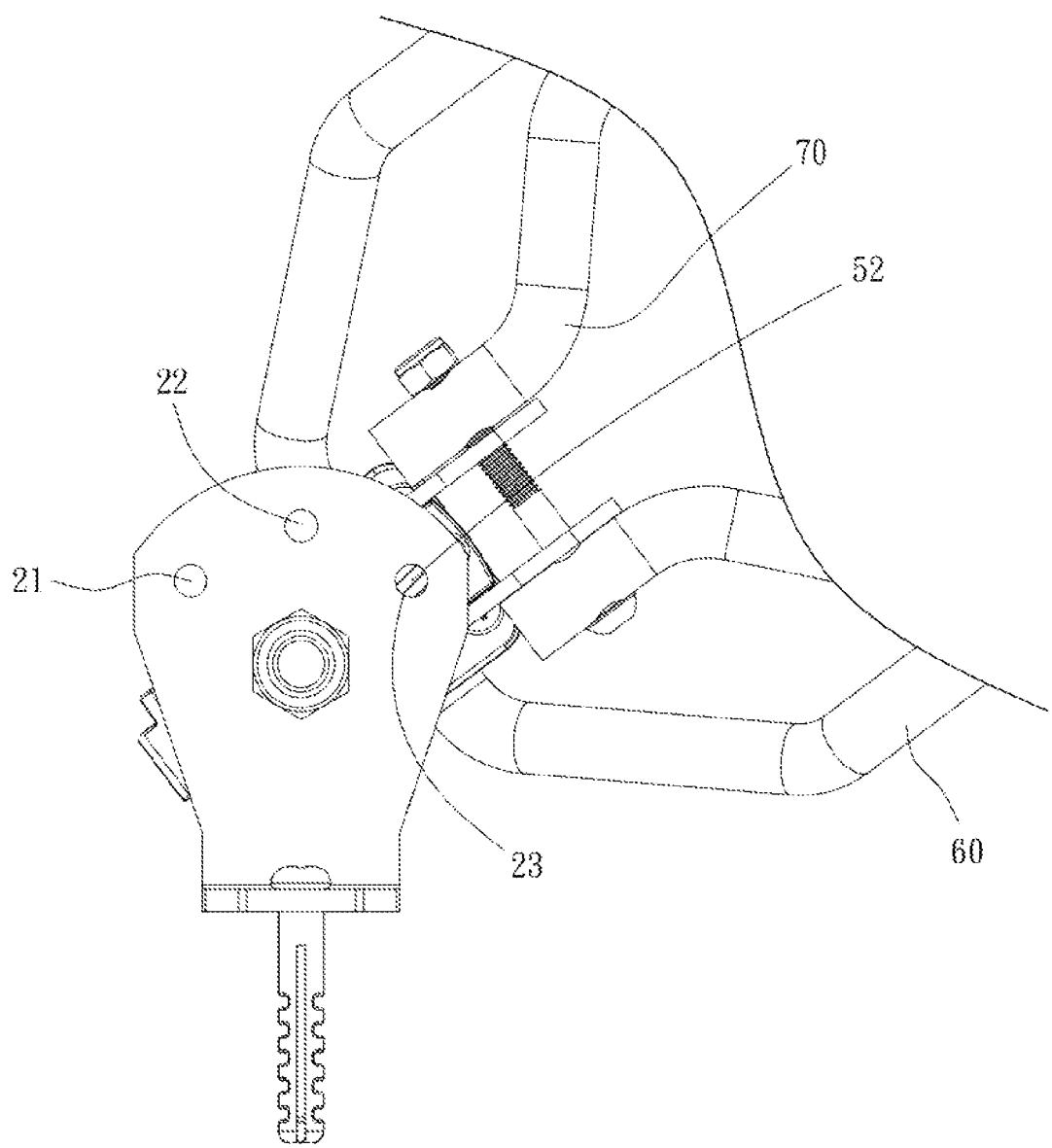
FIG. 9 is a locally enlarged view showing another operation of the wall suspension rack as shown in FIG. 1.

Now, referring to FIGS. 7-9 with reference to FIGS. 1 and 2, when the lower suspension frame 70 is rotated, the connecting seat 51 of the positioning unit 50 is driven by the lower suspension frame 70 and rotated relative to the lower wall seat 20, so that the elastic pin 52 of the positioning unit 50 is moved to elastically extend into one of the positioning recesses 21, 22, and 23 of the lower wall seat 20 as shown in FIGS. 7-9 so that the upper protective frame 60 and the lower suspension frame 70 are positioned at different horizontal positions. Thus, when the elastic pin 52 of the positioning unit 50 is inserted into the positioning recess 22 of the lower wall seat 20 as shown in FIG. 7, the upper protective frame 60 and the lower suspension frame 70 are positioned at the central position. Alternatively, when the elastic pin 52 of the positioning unit 50 is inserted into the positioning recess 21 of the lower wall seat 20 as shown in FIG. 8, the upper protective frame 60 and the lower suspension frame 70 are positioned at the leftward position. Alternatively, when the elastic pin 52 of the positioning unit 50 is inserted into the positioning recess 23 of the lower wall seat 20 as shown in FIG. 9, the upper protective frame 60 and the lower suspension frame 70 are positioned at the rightward position.

In such a manner, the lower suspension frame 70 is positioned between the central position, the leftward position, and the rightward position, so that the user operates the wall suspension rack to hang the bicycle easily and conveniently, and the wall suspension rack is available for indoor spaces with different situations.

Further, the lower wall seat 20 may be provided with more than three positioning recesses which are arranged along an imaginary arc line so that the upper protective frame 60 and the lower suspension frame 70 are positioned at different angles.

Accordingly, when the lower suspension frame 70 is moved to the folded position or the expanded position, the lower suspension frame 70 is positioned simultaneously, so that the user only needs to fold or expand the lower suspension frame 70 directly without having to additionally lock the lower suspension frame 70, thereby simplifying the procedure of operation, and thereby greatly facilitating the user operating the wall suspension rack. In addition, the lower suspension frame 70 swings horizontally to adjust the angles of placement, so that the upper protective frame 60 and the lower suspension frame 70 are positioned at different angles to facilitate the user placing and hanging the bicycle at different situations. Further, the wall suspension rack has fewer parts to reduce the cost of fabrication and production. Further, the wall suspension rack has a simplified construction and is assembled easily and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wall suspension rack for a bicycle, comprising:
an upper wall seat secured to a wall;
a lower wall seat secured to the wall;
an upright post mounted between the upper wall seat and the lower wall seat;
a sliding unit mounted on the upright post;
a positioning unit mounted on the upright post;
an upper protective frame pivotally connected with the sliding unit; and
a lower suspension frame pivotally connected with the positioning unit and the upper protective frame;
wherein:
the lower wall seat is located under the upper wall seat;
the lower wall seat is provided with multiple positioning recesses;
the positioning recesses are arranged at an interval along an imaginary arc line;
the upright post is pivotally connected with the upper wall seat and the lower wall seat;
the upright post is driven and rotated by an external force;
the upright post has a peripheral face provided with an upper block and a lower block;
the upper block and the lower block extend axially on the upright post;
the sliding unit includes a slide, an upper pivot jaw, an upper spring, a lower pivot jaw, and a lower spring;
the slide is slidably mounted on the upright post;
the slide is driven by the external force and moved upward and downward on the upright post;

the upright post extends through the slide;
the upper pivot jaw is pivotally mounted on the slide;
the upper pivot jaw is provided with an upper locking groove;
the upper spring is biased between the slide and the upper pivot jaw;
the upper spring provides an elastic restoring force to the upper pivot jaw;
the lower pivot jaw is pivotally mounted on the slide;
the lower pivot jaw is provided with a lower locking groove;
the lower spring is biased between the slide and the lower pivot jaw;
the lower spring provides an elastic restoring force to the lower pivot jaw;
the positioning unit includes a connecting seat and an elastic pin;
the connecting seat is secured to the upright post;
the connecting seat is rotated in concert with the upright post;
the elastic pin is mounted on a bottom face of the connecting seat;
the elastic pin is moved along the imaginary arc line of the positioning recesses;
when the upright post is rotated by the external force, the elastic pin is moved to align with and detachably extend into one of the positioning recesses;
the upper protective frame is pivotally connected with the slide of the sliding unit;
the lower suspension frame is pivotally connected with the connecting seat of the positioning unit;
the lower suspension frame is driven by the external force and moved reciprocatingly between a folded position and an expanded and suspended position;
when the lower suspension frame is moved to the folded position, the upper block of the upright post is locked in the upper locking groove of the upper pivot jaw of the sliding unit, and when the lower suspension frame is moved to the expanded and suspended position, the lower block of the upright post is locked in the lower locking groove of the lower pivot jaw of the sliding unit.

2. The wall suspension rack for a bicycle as claimed in claim 1, wherein the peripheral face of the upright post is provided with a lower stop located under the lower block.

3. The wall suspension rack for a bicycle as claimed in claim 1, wherein:
the upper pivot jaw has an arcuate top edge;
the upper locking groove is situated at an inner side of the upper pivot jaw;
the lower pivot jaw has an arcuate bottom edge; and
the lower locking groove is situated at an inner side of the lower pivot jaw.

4. The wall suspension rack for a bicycle as claimed in claim 1, wherein the lower suspension frame is an elongated oblong loop.

\* \* \* \* \*